United States Patent [19]

Gaskins

[11] Patent Number: 5,606,315

[45] Date of Patent: Feb. 25, 1997

[54] SECURITY METHOD FOR PROTECTING ELECTRONICALLY STORED DATA

[75] Inventor: Ronald E. Gaskins, Kokomo, Ind.

[73] Assignee: Delco Electronics Corp., Kokomo, Ind.

[21] Appl. No.: 353,745

[22] Filed: Dec. 12, 1994

[51] Int. Cl.⁶ .................................................. G01M 15/00
[52] U.S. Cl. ...................... 340/825.34; 73/116; 324/378; 340/825.31; 380/4; 380/23; 364/424.04
[58] Field of Search ...................... 73/116, 117.3; 324/378; 340/825.31, 825.34; 380/4, 23, 25; 364/424.03, 424.04, 431.01

[56] References Cited

U.S. PATENT DOCUMENTS

| | | | |
|---|---|---|---|
| 4,271,482 | 6/1981 | Giraud | 340/825.34 |
| 4,546,646 | 10/1985 | Takahashi | 73/117.3 |
| 4,588,991 | 5/1986 | Atalla | 340/825.34 |
| 4,677,429 | 6/1987 | Glotzbach | 364/424.04 |
| 4,800,590 | 1/1989 | Vaughan | 380/23 |
| 4,926,330 | 5/1990 | Abe et al. | 364/431.01 |
| 4,959,860 | 9/1990 | Watters et al. | 380/25 X |
| 4,996,643 | 2/1991 | Sakamoto et al. | 364/431.01 |
| 5,003,479 | 3/1991 | Kobayashi et al. | 364/431.01 |
| 5,060,263 | 10/1991 | Bosen et al. | 380/25 |
| 5,115,508 | 5/1992 | Hatta | 340/825.34 |
| 5,222,135 | 6/1993 | Hardy et al. | 380/4 |
| 5,226,080 | 6/1993 | Cole et al. | 380/25 |
| 5,365,587 | 11/1994 | Campbell et al. | 340/825.31 X |
| 5,402,492 | 3/1995 | Goodman et al. | 380/25 |
| 5,475,762 | 12/1995 | Morisawa et al. | 380/25 |

FOREIGN PATENT DOCUMENTS

| | | | |
|---|---|---|---|
| 647393 | 1/1991 | Australia | 364/424.03 |
| 310138 | 12/1990 | Japan | 364/424.04 |
| 6-160245 | 6/1994 | Japan | 364/424.03 |
| 9215852 | 9/1992 | WIPO | 73/117.3 |

*Primary Examiner*—Brian Zimmerman
*Assistant Examiner*—William H. Wilson, Jr.
*Attorney, Agent, or Firm*—Mark A. Navarre

[57] ABSTRACT

A microprocessor based electronic control module with an EEPROM for storing protected data allows the data to be used internally, and allows non-sensitive data to be accessed by external communication tools, but prohibits access to the protected data unless a password is first entered. Then the data may be read from memory and the data or the password may then be changed. For a given model of control module, an ID number is assigned to the password and stored in the module, and can be read to allow the user to find the corresponding password on a secure list available only to authorized personnel. When a password can not be found and it is necessary to change the protected data, the unit can be recovered by a recover procedure wherein the secure data is first erased and then the security is deactivated to grant free access.

9 Claims, 3 Drawing Sheets

SECURITY METHOD FOR PROTECTING ELECTRONICALLY STORED DATA

FIELD OF THE INVENTION

This invention relates to a method of operating an electronic control module and particularly to a method of securing protected data stored in such a module.

BACKGROUND OF THE INVENTION

Internal combustion engines used for automotive vehicles, marine applications and other uses are efficiently controlled by microprocessor based electronic control modules which receive information on operator commands, engine operation parameters and the like and issue control signals for spark timing and fuel control. Such controls are necessary to achieve fuel economy, optimum vehicle performance and compliance with emissions standards. The task of defining the optimum control parameters or calibrations requires the expenditure of much development time and expense for each engine type by the engine manufacturer, and results in an advantage over competitors lacking the optimized parameters.

The control modules are available to any engine manufacturer along with field service tools, calibrations installation tools and calibrations development tools. Heretofore each manufacturer could retrieve the valuable calibrations data from a module using standard tools and pirate the data for use in a similar competing engine. It is thus desirable for an engine manufacturer to safeguard the information installed in such a module. It is generally known to secure electronically stored data such as bank accounts by requiring passwords for access to the information. The same approach can be used for securing the calibration data. That is, a password must be entered in order to retrieve the sensitive data stored in the control module.

A disadvantage of password protection is that if the password becomes lost or forgotten, and it is necessary to access the memory to change the calibration, the module becomes useless. If the module hardware manufacturer becomes a repository of secret passwords, the chance of a security breach is increased, and it is a burden to both the repository and the user to retrieve the password. Moreover it is important for the sake of flexibility that the user create and install the password as required. Thus it is desirable to recover a unit having an unknown password without reducing the security.

Since modules for controlling various engine types have different embodied software, it is desirable to use different passwords for different types to increase security. The modules, however, are identical in physical appearance, and it sometimes occurs that the identity of a module is unknown and thus an authorized user has difficulty in determining which of several passwords to use. Thus it is desirable to establish a way for an authorized user to determine the correct password.

Because it is often necessary for service technicians to access information in the module to analyze engine operation, it is unrealistic to require a password for access to all data. Thus it is desirable to allow free access to that information which does not have to be protected while safeguarding other information.

SUMMARY OF THE INVENTION

It is therefore an object of the invention to safeguard sensitive data in an electronic module by a password scheme while allowing the module to be recovered for use when the password is unknown. Another object is to assist in identifying the type of module to permit an authorized user to determine which password to use in accessing secure data. Still another object is to allow free access to non-sensitive data while safeguarding sensitive data.

A microprocessor-based engine control module suitable for use with a variety of engines contains software supplied by the module manufacturer for spark and fuel control. Specific control parameters or calibrations are developed for each type of engine by the engine manufacturer and loaded into a protected portion of non-volatile read/write memory such as an EEPROM. A password is also loaded into the same memory at a specific address. A part of the software is logic for password protection of the data in the protected portion of memory. Other data loaded into the module or generated by the module are not protected. At the time of manufacture the password address is loaded with a null password and the security is deactivated.

The module is coupled by a serial communication interface to calibrations development or calibrations installation tools which send digital messages to the module to load the calibrations and password, or to write other data to update the module, and read the calibrations, or other service tools to retrieve data useful in trouble shooting the module operation. The protection logic allows free access to unprotected data without the use of any password. Other communication of unprotected data is also allowed as between modules of two engines on the same watercraft or to an instrument panel.

Security is activated by writing a password to the EEPROM password address and removing the operating voltage from the module. This is accomplished by sending a code including the password via the serial communication interface. Once the password is installed and the security is activated, any request for protected data is refused. If the password is entered the security is deactivated for the remainder of the ignition cycle, and a subsequent request during the cycle for calibration data will then be honored, and if desired, the password itself may be changed.

If an incorrect password is entered, the logic will not deactivate the security and any subsequent password entry will not be entertained until the operating voltage is removed and then reapplied to the module. This feature makes it impossible to rapidly try a series of possible passwords to find the correct one. Instead, about two seconds is required to turn the voltage off and on and attempt another password. Because of this time delay feature it would take a single automated device up to 272 years to guess the password if an eight digit password is used. The module has no alternative paths to access the protected data so that there is no practical way for an unauthorized person to discover the data, even by disassembling the module.

Each type of engine control is preferably assigned a unique password and a corresponding identification number. Thus the manufacturer will list all the passwords in use and the corresponding identification numbers. The ID is entered into unprotected memory when the password is loaded. By requesting the ID from the module, the authorized user can determine the correct password from the password list.

If a password cannot be determined from the ID and the password list and is otherwise unknown, the module can be recovered for use by requesting recovery. This is done in two steps to prevent accidental recovery. The first step requires an arming request and the second step requires a recovery request. The protection logic responds to the two requests by first erasing all the protected data and then deactivating security. Then the module may be reloaded with calibration data, a new password and corresponding ID.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
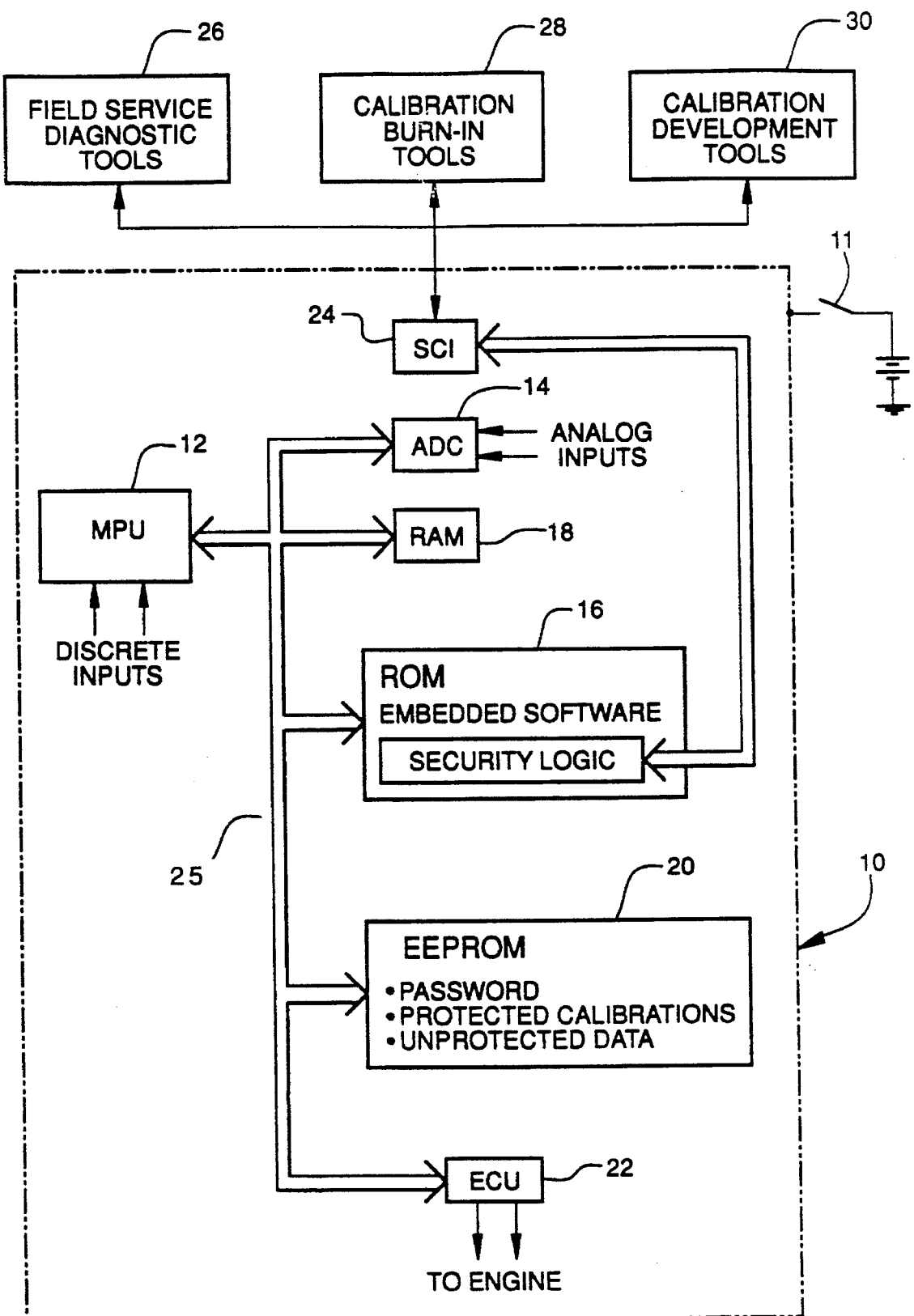
FIG. 1 is a block diagram of an engine control module suitable for use with the method of the invention.

Referring to FIG. 1, an engine control module 10 is supplied with operating voltage through a vehicle ignition switch 11. The module 10 is a single semiconductor chip which includes a microprocessor unit (MPU) 12, an analog-to-digital converter (ADC) 14, a read-only-memory (ROM) 16, a random access memory (RAM) 18, an electrically erasable programmable read-only-memory (EEPROM) 20, an engine control unit (ECU) 22, and a serial communication interface (SCI) 24. The MPU 12 may be a microprocessor model MC-6100 manufactured by Motorola Semiconductor Products, Inc. Phoenix, Ariz. The MPU 12 communicates with the rest of the system by an 8 bit bi-directional data bus 25.

The ROM 16 contains the program steps for operating the MPU 12, and tables and non-sensitive constants used in determining engine fuel and ignition control parameters. The ROM 16 also contains security logic which is used to prevent unauthorized access to sensitive data stored in the EEPROM 20. The EEPROM has an address for a password, and addresses for sensitive data, particularly calibration parameters, as well as addresses for non-sensitive data. The RAM 18 temporarily stores data which may be read from various locations determined in accord with the program stored in the ROM. Discrete inputs are directly coupled to the MPU and analog inputs from operator controls or engine sensors are received at the ADC 14 and digitized for use by the MPU. The ECU 22 produces module outputs to the engine for fuel control and spark control.

The SCI 24 receives messages from and responds to external tools such as field service diagnostic tools 26, calibration burn-in tools 28 and calibration development tools 30. The diagnostic tools 26 are used by service technicians to trouble shoot engine operation, and request and receive non-sensitive information such as engine speed. The calibration development tools 30 are used by engineers in the development of calibration data which, when finalized, is saved in a file which is given to the engine manufacturer. The calibration burn-in tools 28 are used by the engine manufacturer to enter the file of calibration data into the EEPROM. The tools issue a number of digital codes which are interpreted by the module as requests or commands to read data from the module, write data into a memory location, or other instructions. The messages are routed to the security logic program which filters the messages, passing those dealing with non-sensitive data, and evaluating whether other messages should be honored. The SCI also handles communication with other on-board devices.

It is well known to provide an ECM with a bootstrap mode which is permitted by a special boot ROM area which manages the downloading of a program into RAM via the SCI, and access to calibration data can be obtained. The module may have architecture which provides the bootstrap capability, but it also has a security flag preventing such operation. The security flag is burned into the chip at the time of manufacture to positively prevent access to the calibration data. Further since the protection program and the EEPROM containing the protected data are on the same chip, it is not possible to physically remove the EEPROM from the protected environment to read the memory contents.

Upon manufacture of the module chip the password by default is set at FFFFFFFF. The program recognizes two password states, 00000000 and FFFFFFFF as null passwords and the security is deactivated for that condition. Thus the module is in condition to be loaded with secure data, a password and ID number by the engine manufacturer.

Figure 2A:
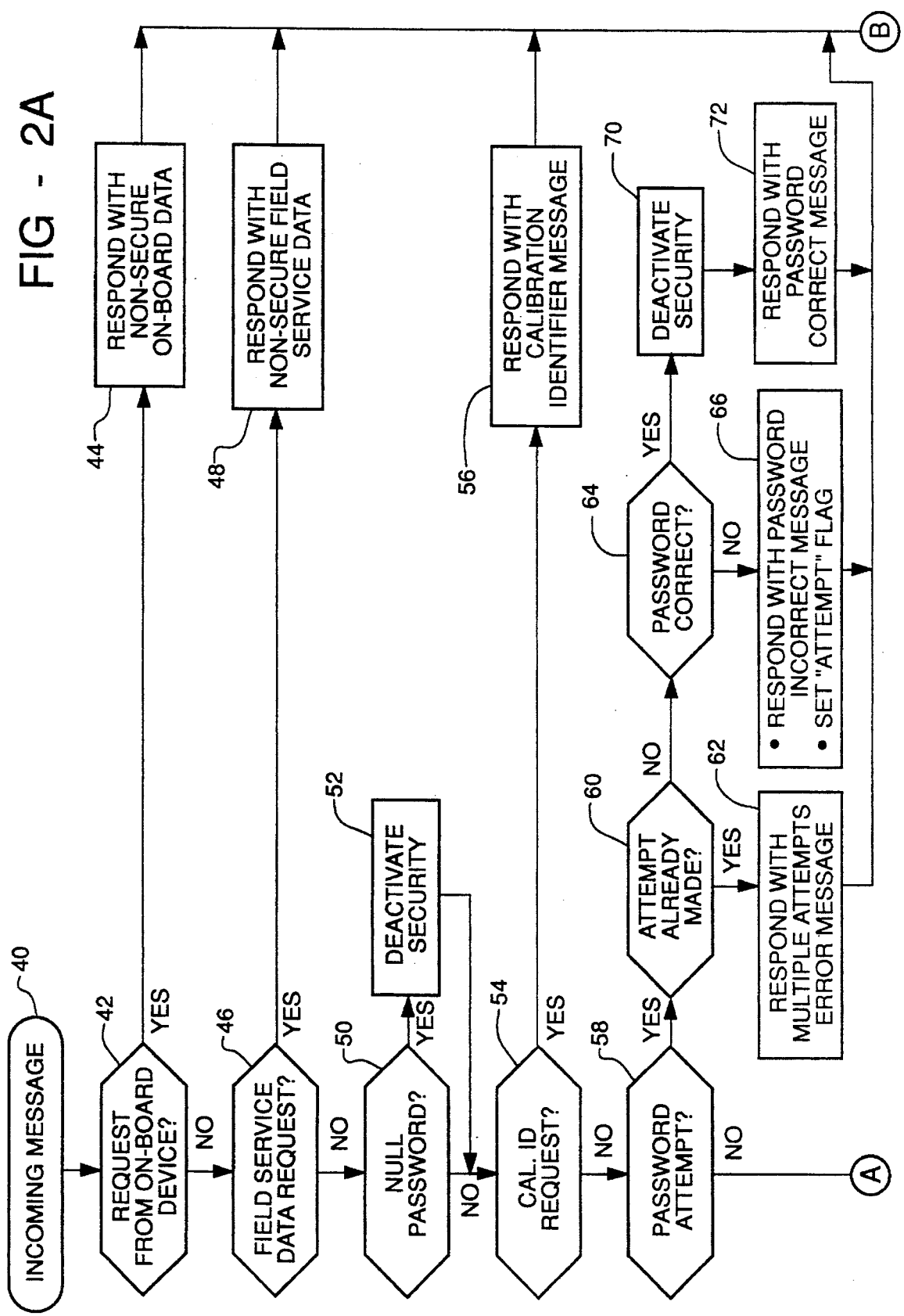
FIGS. 2A and 2B comprise a flow chart representing the security program embedded in the module of FIG. 1 according to the invention.
Figure 2B:
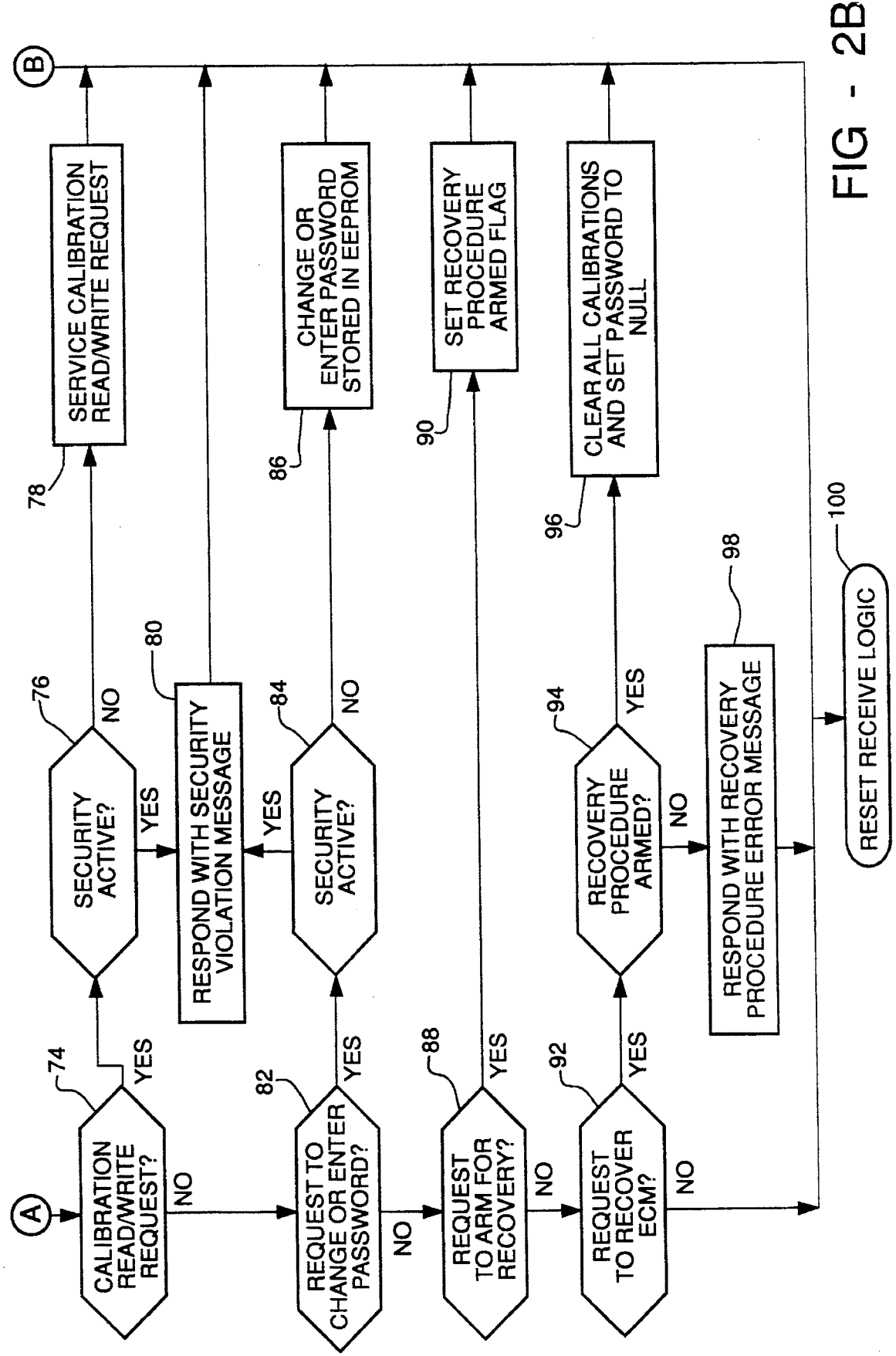

The security logic program is represented by the flow chart of FIGS. 2A and 2B. In the following description, numerals in angle brackets <nn> refer to functions in flow chart blocks bearing the corresponding reference number. When an incoming message is received from a tool or on-board device <40>, the logic examines the message code to determine the response to be sent via the SCI. If the request is for non-secure data from an on-board device such as an instrument panel or a twin engine <42> the module responds by providing non-secure on-board data <44>. If the message is a request for field service data <46>, then that data is supplied in response <48>. All other requests affect the security of the protected data. The program checks to determine whether a null password is present <50> and if so, the security is deactivated <52>. Next the program checks for a request for an ID number <54>. If ID is requested it is supplied to the requesting tool <56>.

When the message is an attempt to enter a password <58>, it is first determined if a previous attempt has been made during the same ignition cycle <60> and if so an error message to that effect is given in response <62>. If there was no previous attempt and the password is incorrect <64> a password incorrect message is given <66> and an "attempt" flag is set for subsequent use by block 60. The flag will be cleared when the ignition cycle ends, i.e., when operating voltage is removed from the module. This feature imposes a time delay which defeats a brute force attempt to gain access by rapidly trying all possible passwords. If the password is correct <64> the security is deactivated <70> and a password correct message is returned <72>. The security will remain deactivated until the operating voltage is removed to allow free access to the protected data and the password.

If a calibration read or write message is received <74> and the security is not active <76> the request will be serviced <78>, and if security is active a security violation message will be sent <80>. Similarly, if a request to change the password or initially enter a password is received <82>, and security is not active <84> it will be honored <86> and if security is active the violation message will be sent <80>. Thus changes in protected data are easily made by one who has the correct password. When a password is entered the security is activated when the operating voltage is removed from the module.

If a password has been lost and it is necessary to change the calibration of the module, and even the report of the ID number does not yield a listed password, the unit is recovered by first requesting to arm for recovery. If such a request is received <88> a recovery procedure "armed" flag is set <90>. Then if a request to recover message is received <92> and the "armed" flag has been set <94>, the calibrations are cleared from the EEPROM and the password is set to null <96>. If the "armed" flag is not set a recovery procedure error message is sent <98>. If the message does not fit any of the above categories or a response to a message has been made, the logic is reset to receive another message <100] at block 40.

It will thus be appreciated that the control module is furnished with a very high degree of security of data which must be protected while affording the user manufacturer ease of access to load or change the calibrations and even to reuse a module for which the password is unknown.

The embodiments of the invention in which an exclusive property or privilege is claimed are defined as follows:

1. In an electronic control module for an internal combustion engine comprising a microprocessor, a ROM containing a controller program and a data security program and a non-volatile memory having data protected addresses including a password address, means for reading and writing protected data to the data protected addresses, and communications means for receiving and sending messages; the method of maintaining secrecy of protected data comprising the steps of:

activating security by writing a password into the data protected password address;

when security is activated, rejecting messages requesting protected data;

deactivating security by supplying a correct password;

complying with requests for reading or writing protected data when security is deactivated;

entering a command for access to protected addresses irrespective of the state of security to recover said electronic control module without use of a password; and responding to the command by erasing the protected data and then complying with the command, thereby ensuring the secrecy of the protected data.

2. The electronic control module of claim 1 wherein:

the step of entering a command for access comprises requesting release of security protection; and the step of responding to the command comprises erasing the protected data and writing a null password.

3. The electronic control module of claim 1 wherein:

the step of entering a command for access comprises requesting release of security protection;

the step of responding to the command comprises erasing the protected data and writing a null password; and reactivating security by writing new data and a new password to protected addresses.

4. The electronic control module of claim 1 wherein the step of entering a command for access comprises the steps of:

first, entering a request to arm for recovery; and second, entering a request to recover the module.

5. The electronic control module of claim 1 wherein the steps of entering a command and responding to the command comprise:

entering a request to arm for recovery;

responding to the request by arming the module for recovery;

then entering a request to recover the module; and responding to the command request to recover by erasing the protected data and deactivating security.

6. The electronic control module of claim 1 including the method of changing the password comprising the steps of:

requesting a change of password when security is deactivated;

supplying a new password; and entering the new password at the password address.

7. The electronic control module of claim 1 wherein a control module has installed therein one of several sets of protected data wherein each set has a corresponding unique password and a corresponding unprotected identification number, wherein the method includes:

requesting the identification number of the installed set of protected data;

responding with the identification number corresponding to the set of protected data; and entering the password corresponding to the identification number, whereby the security is deactivated.

8. The electronic control module of claim 1 further comprising the steps of:

energizing the module by supplying an operating voltage;

rejecting any attempt to enter an incorrect password; and after rejecting such an attempt, rejecting any further password entry attempts while the operating voltage continues to be supplied.

9. The electronic control module of claim 8 wherein a correct password is accepted after a rejection by the steps of:

removing and then reapplying the operating voltage; and then deactivating security by entering a correct password.

* * * * *